United States Patent [19]

Iliopulos

[11] Patent Number: 4,579,876

[45] Date of Patent: Apr. 1, 1986

[54] POLYOLS FOR THE PRODUCTION OF RIGID POLYURETHANE FOAMS

[75] Inventor: Miltiadis I. Iliopulos, Coraopolis, Pa.

[73] Assignee: Mobay Chemical Corporation, Pittsburgh, Pa.

[21] Appl. No.: 690,300

[22] Filed: Jan. 10, 1985

Related U.S. Application Data

[63] Continuation of Ser. No. 581,515, Feb. 21, 1984, abandoned, which is a continuation-in-part of Ser. No. 494,827, May 16, 1983, abandoned.

[51] Int. Cl.$^4$ ............................................. C08G 18/14
[52] U.S. Cl. ...................................... 521/136; 521/164; 521/166; 528/145; 528/146; 528/154
[58] Field of Search ..................... 521/136, 164, 166; 528/145, 146, 154

[56] References Cited

U.S. PATENT DOCUMENTS 3,436,373  4/1969  Cox et al. ........................ 521/164
4,273,700  6/1981  Kho ................................. 528/154

Primary Examiner—Maurice J. Welsh
Attorney, Agent, or Firm—Gene Harsh; Joseph C. Gil

[57] ABSTRACT

A polyol comprising an alkoxylated modified resole, said modified resole being formed by the reaction of
(i) a phenolic compound and/or mixtures of homologues thereof,
(ii) urea and/or melamine,
(iii) an organic primary and/or secondary amine group-containing compound, and
(iv) an aldehyde.

8 Claims, No Drawings

POLYOLS FOR THE PRODUCTION OF RIGID POLYURETHANE FOAMS

RELATED APPLICATIONS

This application is continuation of application Ser. No. 581,515 filed Feb. 21, 1984 which itself is a continuation-in-part of U.S. application Ser. No. 494,827 filed May 16, 1983, both of which are now abandoned.

BACKGROUND OF THE INVENTION

The present invention relates to a new class of polyols useful in the production of rigid polyurethane foams.

Several polyols are known and used in the art for the production of rigid polyurethane foams. In the area of polyols used for the so-called spray foams, those of the type disclosed in U.S. Pat. Nos. 3,297,597 and 4,137,265 have been particularly successful. In general, polyols of this type are prepared by alkoxylating the Mannich reaction product of a phenolic compound, an alkanolamine and formaldehyde. Similar polyols are described in U.S. Pat. No. 3,671,470.

It is further known to prepare polyols by alkoxylating a resole prepared by reacting a phenolic compound, urea (or melamine or dicyandiamide) and formaldehyde (see, e.g., U.S. Pat. No. 4,036,790). It has also been suggested to blend the resultant urea-modified resole based polyol with a Mannich based polyol of the type described in the above-noted U.S. Pat. Nos. 3,297,597 and 4,137,265 (see, col. 3, lines 15-19 of U.S. Pat. No. 4,036,790).

Finally, it is known to produce polyols by alkoxylating a condensation product of an aromatic amine, a phenolic compound and formaldehyde (see U.S. Pat. No. 3,222,305).

Although the polyols noted above have met with success, they suffer from several disadvantages. In the case of the Mannich based polyols and depending upon the molar ratios and the structures of the reactants, the Mannich reaction product (i.e., prior to alkoxylation) may not be stable at room temperature and upon sitting at room temperature undergoes further reaction. Such reaction products will be stable if the ortho and para positions of the phenolic nucleus are substituted with non-reactive groups, unless one of the phenolic ring positions is occupied with a methylol group. In addition, para-or ortho-substituted phenols (e.g., p-nonyl phenol), when reacted with adequate quantities of formaldehyde and an amine will form a structure which should be stable. The alkoxylated polyols have good shelf-life stability, however, the spray foams derived from such polyols do not exhibit entirely satisfactory dimensional stability.

DESCRIPTION OF THE INVENTION

The present invention is directed to a new class of poylols useful in the production of rigid polyurethane foams, the process of producing said polyols, and rigid polyurethane foams made from such polyols. It has been found that at a given density, foams produced from the polyols of the present invention exhibit enhanced dimensional stability when compared to commercially available polyols. Further, the reaction product prior to alkoxylation is storage stable at room temperature when specified molar ratios of the reactants are used. Finally, in the case of the use of urea in high molar ratios, the overall cost of the polyol is greatly reduced.

More particularly, the polyols of the present invention are prepared by alkoxylating the modified resole formed by the reaction of (i) a phenolic compound and/or mixtures of its homologues, (ii) urea and/or melamine, (iii) an organic primary and/or secondary amine group containing compound which may optionally contain hydroxyl groups, and (iv) an aldehyde.

In general, the modified resole is prepared by premixing the phenolic compound, the urea and/or melamine and the primary and/or secondary amine (which may optionally contain hydroxyl groups) and then adding the aldehyde to the mixture at a temperature below the temperature of resole formation (a temperature that will vary with the phenolic compound used and is a temperature of less than 35° C. in the case of phenol). At the end of the aldehyde addition, the mixture is slowly heated to a temperature within the range of from 50° C. to 150° C., preferably from 75° C. to 120° C. (and most preferably at about 100° C.) for a period of time to reduce the formaldehyde content to as low as or lower than about 1% by weight. This will generally require a reaction time of from about two to about four hours at the elevated temperature.

At the end of the reaction, water is stripped from the reaction mixture to provide a crude reaction product containing from about 0.01 to about 10 percent by weight, and preferably from about 0.1 to about 6 percent by weight water. It is a feature of this invention that the entire crude product is alkoxylated as such.

The phenolic compound to be employed in the reaction is an aromatic compound containing one or more hydroxyl groups attached directly to the aromatic nucleus and having a hydrogen atom on one or more of the ring positions ortho and para to the hydroxyl group and which is otherwise unsubstituted or substituted with substituent groups which are non-reactive under reaction conditions. Substituent groups that may be present include alkyl, cycloalkyl, aryl, halo, nitro, carbalkoxy, haloalkyl and hydroxyalkyl. The phenolic compound is further characterized by a molecular weight within the range of from about 94 to about 500. Examples of acceptable phenolic compounds include o-, m-, or p-cresols, ethylphenol, nonylphenol, p-phenylphenol, p-dodecylphenol, 2,2-bis(4-hydroxyphenyl)propane, β-naphthol, β-hydroxyanthracene, p-chlorophenol, o-chlorophenol, o-bromophenol, p-bromophenol, 2,6-dichlorophenol, p-nitrophenol, 4-nitro-6-phenylphenol, 2-nitro-4-methylphenol, 3,5-dimethylphenol, p-isopropylphenol, 2-bromo-4-cyclohexylphenol, 2-methyl-4-bromophenol, 2-(2-hydroxypropyl)-phenol, 2-(4-hydroxyphenyl)ethanol, 2-carbethoxyphenol and 4-chloromethylphenol. Phenol is the presently preferred phenolic compound.

The second component of the reaction mixture is urea and/or melamine. Dicyandiamide may also be used.

The third component is an organic primary and/or secondary amine group containing compound which may optionally contain hydroxyl groups. The amines useable herein include lower aliphatic, cycloaliphatic, heterocyclic, aromatic, alaromatic, and araliphatic amines. Useful amines include alkanolamine selected from the group consisting of alkanolamines having the formulae:

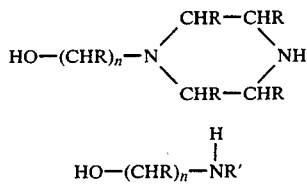

$$HO-(CHR)_n-NR'$$
$$|$$
$$H$$

wherein R is selected from the group consisting of hydrogen and $C_1$-$C_4$ alkyl, R' is selected from the group consisting of hydrogen, $C_1$-$C_4$ alkyl and —(CHR-$)_n$—OH, and n is a positive integer having a value of two to five. Examples of suitable alkanolamines that may be used include monoethanolamine, diethanolamine, isopropanolamine, propanolamine, dipropanolamine, diisopropanolamine, 2-amino-1-butanol, N-hydroxyethylbutylamine, hydroxyethylpiperazine, N-hydroxybutylamine, N-hydroxyethyl2,5-dimethylpiperazine and the like.

Other useful amines include ethylamine, isopropylamine, dibutylamine, cyclohexylamine, 2-phenylethylamine, N-methyl phenylethylamine, piperidine, p-(2-aminoethyl)phenol, and the like.

In preparing the modified resoles of the present invention, any suitable aldehyde capable of reacting with phenol can be used. The preferred aldehyde is formaldehyde which can be in aqueous solution or in low polymeric form, such as paraformaldehyde. The suitable aldehydes include acetaldehyde, propionaldehyde, butyraldehyde, benzaldehyde, furfural, 2-ethylhexanal, ethylbutyraldehyde, heptaldehyde, pentaerythrose and glyoxal.

Solvents, such as water or alcohols, can be used, although excess reactants may be employed for the same purpose if desired. The reaction generally takes place at room temperature and is sufficiently exothermic to make cooling of the reaction mixture advisable in most cases. When the exothermic reaction subsides, the reaction may be driven to completion by heating under reflux for a period varying from a few minutes to several hours, depending on the reactants, at temperatures which will generally range from about 50° C. to not more than 150° C., and preferably from 75° C. to 120° C. and most preferably at about 100° C. Since the condensates decompose at elevated temperatures it is essential that the reaction mixture not be heated above this decomposition point. Also the reaction between phenols and formaldehyde in alkaline medium to form Resoles is promoted at elevated temperatures and the temperature of the reaction mixture is frequently kept below the temperature of Resole formation, especially during the first stages of the reaction. When the reaction is completed, water and any excess reactants or solvent are removed, conveniently by stripping them off under vacuum. The crude reaction product, which usually consists of a mixture of isomers, may be employed as such without further fractionation, or the individual components may be isolated, if desired.

In general, the characteristics of the reaction product and, consequently, the characteristics of the alkoxylated reaction product may be varied over wide limits by the choice of the phenolic compound, the amine, the urea and/or melamine and the aldehyde. In general, the phenolic compound, urea and/or melamine, the amine and the aldehyde are employed in a molar ration of 1:0.1–3.0:0.5–3:1–6.

In accordance with the present invention, the reaction product is reacted with an alkylene oxide to provide the final polyol. A portion of the nitrogen present in the condensate has sufficient catalytic activity to promote the reaction of the alkylene oxide with each free basic amino hydrogen atom and hydroxyl group and no additional catalyst is needed. The alkoxylation is generally conducted at a temperature of about 50° C. to about 180° C.

The actual product (or polyol) of the present invention actually contains some quantities of diols, triols, pentols and heptols having varying degrees of alkoxylation. Since the new polyols of the present invention are complex mixtures, they are herein defined for the purpose of this application as alkylene oxide adducts of the modified resoles formed by reacting a phenolic compound, an amine, urea and/or melamine, and an aldehyde. The adducts will also contain varying quantities of diols of different molecular weights which are produced by the reaction of the alkylene oxide with any residual water.

In general, the amount of alkylene oxide used is such that one mol of alkylene oxide is present for each free hydroxyl group, free amino-hydrogen and any residual water. It is, of course, possible to add less than one mol of alkylene oxide per free phenolic and primary and/or secondary hydroxyl group in the condensation product. The minimum desirable amount of alkylene oxide is one mol per free amine hydrogen atom and phenolic hydroxyl group. In general, phenolic hydroxyl groups form unstable urethane linkages and so are to be avoided where practical. Since phenolic hydroxyl groups are more reactive than alcoholic hydroxyl groups, the phenolic hydroxyl groups will react with the alkylene oxide first in the absence of a basic -NH group, thereby assuring reaction of the phenolic hydroxyl groups when less than the stoichiometric amount of alkylene oxide is used. Generally, more than the minimum amount of alkylene oxide is used to obtain a product having a lower hydroxyl number and lower viscosity.

Examples of alkylene oxides that can be used include ethylene oxide, propylene oxide, butylene oxide, styrene oxide, glycidol and heteric or blocked mixtures thereof. The alkylene oxide of choice of the present invention is propylene oxide.

In general, the alkoxylation reaction is conducted within a temperature range of from about 50° C. to about 180° C. No external catalyst is necessary since the reaction product (i.e., the modified resole) is capable of autocatalyzing the alkoxylation reaction. It is generally preferred that the hydroxyl number of the alkoxylated product be in the range of from 400 to 700, and kreferably 400 to 600.

The polyols produced according to the present invention are highly useful in the production of rigid polyurethane foams. Processes for producing polyurethane and/or polyisocyanurate foams from polyisocyanates, polyethers, catalysts, water and/or other blowing agents, stabilizers and other additives are, of course, well known in the art.

As hereinbefore stated, the polyols of the present invention offer many advantages in the preparation of rigid polyurethane foams. Although a polyurethane and/or a polyisocyanurate foam may be prepared from a polyol component consisting entirely of a polyol of the present invention, it may be desirable to employ a polyol component containing from about 30 to about 100 weight percent of a polyol of the present invention, with the remainder being a conventional polyol (or mixture of such conventional polyols) normally used to prepare rigid urethane and/or isocyanurate foams. Many examples of such polyols are known to those skilled in the art and may include those prepared by the reaction of an alkylene oxide selected from the group consisting of ethylene oxide, propylene oxide, 1,2-butylene oxide, styrene oxide, epichlorohydrin, glycidol and mixtures thereof with a polyhydric compound selected from the group consisting of carbohydrates and aliphatic and aromatic compounds containing from about three to about eight hydroxyl groups, such as hexanetriol, pentaerythritol, sorbitol, methyl glucoside, sucrose, 1,3,3-tris(hydroxypropoxyphenol)-propane, etc. In addition, alkylene oxide adducts of certain amines such as, for example, propylene oxide adducts of ethylene diamine, aminoethylpiperazine, etc., may be used. Certain hydroxy-terminated polyesters are also used to prepare rigid urethane and/or isocyanurate foams. These are usually prepared from dibasic acids such as phthalic and adipic acids and diols or triols such as, for example, diethylene glycol, glycerine, trimethylolpropane, etc.

In preparing foams from the instant polyols, conventional foam preparation procedures are used. Polyisocyanates, blowing agents, foam stabilizers and fire-retardants useful in the preparation of rigid polyurethane and/or polyisocyanurate foams are well known to those skilled in the art. Such components are described, for example, by Frisch et al in an article entitled "Advances in Technology and Uses of Rigid Urethane Foams" (*Modern Plastics* 40, 165, October, 1962).

The most commonly used foam stabilizers are silicone oils, usually silicone-glycol copolymers. Examples of silicone foam stabilizers are those sold under the tradenames of SF-1066, DC-193, L-520, L-5340, L-5320 and the like. Blowing agents used to prepare urethane foams are described in U.S. Pat. No. 3,072,582. Blowing agents are generally volatile liquids such as, for example, trichlorofluoromethane. Fire retardants that can be incorporated in the foaming mixture are of two types--those that are incorporated by mere mechanical mixing and those that become chemically bound in the polymer chain. The most commonly used of the first type are tris(chloroethyl)phosphate, diammonium phosphate, various halogenated compounds and antimony oxide. The second type of fire retardant probably offers the best approach to the problem of fire retarding foams. Examples of this type of fire retardant include chlorendic acid and various phosphorus-containing polyols, such as

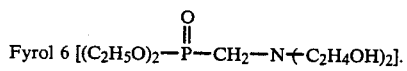
Fyrol 6 [(C$_2$H$_5$O)$_2$—P—CH$_2$—N—(C$_2$H$_4$OH)$_2$].

Although the presence of an amine catalyst such as triethylene diamine, triethylamine, dimethylpiperazine, etc., is normally required to prepare an acceptable polyurethane foam, it is an advantage of the present invention that such an amine catalyst is not necessary. If a faster rise time or tack-free time is desired, one of the above-described amine catalysts may be added. Known tin catalysts can also be used.

The organic polyisocyanate is suitably an organic aromatic or aliphatic polyisocyanate such as 3,3'-dichloro-4,4'-biphenyl diisocyanate, diphenyl diisocyanate, ethylene diisocyanate, propylene-1,2-diisocyanate, 1,4-tetramethylene diisocyanate, p-phenylene diisocyanate, 2,4- and 2,6-toluene diisocyanate, o,o'-, o,p'- and p,p'-diphenylmethane diisocyanate, hexamethylene diisocyanate, polymethylene polyphenylisocyanate, and mixtures thereof.

The invention will be further described and illustrated by the following specific examples.

EXAMPLES

EXAMPLE A

A reactor was charged with 3274.4 grams (31.18 mols) of diethanolamine and 207.9 grams (3.46 mols) of urea while stirring and cooling. Water (464.1 grams) was then added to dissolve the crystallizing mixture. To this mixture, 1085.5 grams (11.55 mols) of phenol were charged portionwise, while its temperature was kept below 38° C.

When the temperature of the reaction mixture was decreased to 32° C., 3090.0 grams (38.07 mols) of formaldehyde (as 37 weight percent formalin solution) were added within a period of two hours while the temperature was maintained below 30° C. through external cooling. The stirred reaction mixture was kept at 35° C. for approximately one hour and then heated to 83° C. and kept at this temperature for an additional hour. The water was then stripped from the reaction mixture under reduced pressure (400–18 mm Hg) and at a temperature range of 84°–95° C. The water content of the stripped urea-modified nitrogen containing resole was found to be 0.76 weight precent and its hydroxyl number 1069.

To 7880 grams of the above product was added propylene oxide (7854 grams; 135.4 mols) under agitation at ca. 105° C. and a pressure of 29 psig. The propoxylated resole was subsequently stripped to yield a product identified as polyol I (Table 1).

EXAMPLE B

Diethanolamine (2044.3 grams; 19.433 mols), phenol (3660.8 grams; 38.899 mols) and urea (1167.1 grams; 19.43 mols) were placed in the reactor while cooling and agitating. The temperature of the mixture increased to 61° C. When the temperature of the mixture was decreased to 37° C., 3127.8 grams (38.547 mols) of formaldehyde (as 37 wt. percent formalin solution) were added slowly while the temperature was maintained below 50° C. After completion of the addition and cease of the exotherm, the reaction mixture was heated to 85° C. and held at this temperature for approximately one hour under agitation. The water was stripped under the same conditions described in Example A. The obtained urea-modified nitrogen containing resole had a hydroxyl number of 682 and a viscosity of 19,000 cps at 73° C. Its water content was found to be 0.017 weight percent.

To 6530.1 grams of this product was added 6538 grams (112.7 mols) of propylene oxide at ca. 105° C. and a pressure of 29 psig. The stripped product was identified as polyol II (Table 1).

EXAMPLE C

This polyol was made following the procedure of Example B with the exception that the amount of urea was reduced by half (103.95 grams; 1.73 mols). The propoxylated condensate is referred to as polyol V (Table 1).

EXAMPLE D

The reactor was charged with the starting materials in the sequence and under the conditions shown below. During this operation the reaction mixture was agitated.

| Diethanolamine | 3274.4 grams | (31.14 mols) |
| --- | --- | --- |
| Water | 464.1 grams | |
| Melamine | 291.5 grams | (2.31 mols) |
| Phenol | 1085.5 grams | (11.53 mols) |

When the mixture reached a temperature of 36° C., 3090.8 grams (38.08 mols) of formaldehyde (as 37 weight percent formalin solution) was added within a period of 1.5 hours while the temperature of the reaction mixture was maintained below 40° C.

After the reaction exotherm had ceased, the mixture was heated to 85° C. and kept at this temperature for one hour.

The water was stripped at a temperature range of 86°–100° C. and a pressure of 320−8 mm Hg. The resulting condensate, a nitrogen containing melamine-modified resole was found to contain 0.18 weight percent water and had a hydroxyl number of 876.

8037.5 grams of the intermediate product was epoxidated with 6719 grams (115.8 mols) of propylene oxide at ca. 105° C. and a pressure of 29 psig. Properties of this polyol, identified as polyol IV, are given in Table 1.

EXAMPLE E

The same procedure and quantities of phenol, diethanolamine, melamine and formaldehyde were used in the preparation of the intermediate resole as in Example D. The procedure for the epoxidation was slightly modified.

The addition of 7128 grams (122.9 mols) of propylene oxide to 7950 grams of this intermediate took place at a temperature of ca. 105° C. and at a pressure of 29 psig. However, due to some difficulties encountered during the epoxidation, the propylene oxide addition was shortly interrupted to charge 200 ml of toluene. The epoxidation step required approximately 13 hours. The properties of this polyol, identified as polyol III, are listed in Table 1.

EXAMPLE F

The reactor was charged under agitation with 13.97 lbs (60.3 mols) of diethanolamine, 10.64 lbs of water, 25.0 lbs. (120.6 mols) of phenol and 7.98 lbs. (60.3 mols) of urea. Formaldehyde in the form of a 37 wt. percent formalin solution was added within a period of 1.5 hours (2.16 lbs. of formalin solution, corresponding to 120.64 mols of formaldehyde). The temperature of the reaction mixture was kept at 35° C. for one hour, 83° C. for an additional hour and then heated to 90° C. at which temperature the water was stripped under reduced pressure (700-60 mm Hg).

The water content of the resole was found to be 0.8 wt. percent and its viscosity at 73° C. 14,000 cps. The OH number was 728. To 8000 grams of this resole were added 1600 grams of toluene and subsequently 9716 grams (220.8 mols) of ethylene oxide. The properties of the stripped polyol, identified as polyol VI, are shown in Table 1.

EXAMPLE G

The intermediate resole was derived from phenol, diethanolamine, urea and formaldehyde at the ratios as shown in Example F.

The stripped resole contained 5.6 wt. percent water, had a viscosity of 1108 cps at 73° C. and a hydroxyl number of 688.

To 7012.7 grams of this resole 9629 grams (166.0 mols) of propylene oxide were added. The properties of the stripped polyol, identified as polyol VII, are given in Table 1.

EXAMPLES H, I AND J

The same procedure was followed in each of these examples, producing three separate condensates and polyols each time.

A 5-gallon stainless steel reactor was charged at 25° C. with 1,774.4 grams (98.52 mols) of water, 2,329.8 grams (22.15 mols) of diethanolamine, and 1,330.8 grams (22.15 mols) of urea. This mixture was stirred until the urea dissolved at which point 4,169.3 grams (44.30 mols) of phenol were added with stirring. The resulting mixture was cooled to 22° C. and 3,595.6 grams (44.30 mols) of 37% formaldehyde was added over a 40-minute period while maintaining a temperature of 22°-24° C. The reaction was completed by holding the mass at 35° C. for 1 hour, followed by 1 hour at 83° C. The water content of this product was then reduced to approximately 5.5% by distillation at 90° C. and 300 mm Hg. A total of 2,017 g was removed for sampling purposes. The properties of the three condensate so produced are shown below:

| PreCondensate No. | Visc. Cps @ 25° C. | Hydroxyl No. (OH#) | Water % | Total N % | Acid No. |
| --- | --- | --- | --- | --- | --- |
| I | 57,750 | 646 | 5.38 | 3.40 | nil |
| II | 56,000 | 627 | 5.57 | 3.43 | 3.3 |
| III | 40,750 | 626 | 5.34 | 3.50 | 4.4 |

The condensates were then each heated to 105° C. and 9,288 g of propylene oxide (159.9 mols) were added each time over a period of 8 hours at a temperature of 105° C. and pressure of 30 psig. The polyol was then stripped of volatiles (110° C., 5 mm Hg), then mixed with 1.6 g of 2,6-di-tert-butyl-para-cresol. The properties of the three polyols so produced are reported in Table 1 as polyols VIII, IX and X, respectively.

| Polyol No. | Visc. cps. @ 25° C. | Hydroxyl No. (OH#) | Water % | Total N % | Acid No. |
| --- | --- | --- | --- | --- | --- |
| I | 24,250 | 495 | 0.04 | 4.79 | n.d. |
| II | 83,500 | 537 | 0.14 | n.d. | n.d. |
| III | 46,000 | 475 | 0.05 | 4.6 | n.d. |
| IV | 85,000 | 488 | 0.07 | n.d. | n.d. |
| V | 28,100 | 520 | 0.05 | n.d. | 0.29 |
| VI | 9,640 | 503 | 0.04 | n.d. | 0.34 |
| VII | 12,200 | 564 | 0.14 | 4.70 | nil |
| VIII | 8,309 | 512 | 0.03 | n.d. | 0.1 |
| IX | 12,000 | 540 | 0.35 | n.d. | 0.6 |
| X | 10,360 | 539 | 0.07 | n.d. | 0.06 |

All the polyols listed in Table 1 were investigated in regard to their compatibilities and stability toward commonly used urethane chemicals. They were found to be miscible within the tested ranges which are generally applied in spray foam applications.

The polyol #VI epoxidated entirely with ethylene oxide, exhibits a very low miscibility with Freon R-11.

Most of the novel polyols are miscible with each other in any proportion. For example, a mixture of equal parts by weight of Polyols VIII, IX and X resulted in a homogeneous liquid and stable composition having the following properties:

| | |
|---|---|
| Viscosity at 25° C.: | 10,780 cps |
| Hydroxyl Number: | 529 |
| Acid Number: | nil |
| Wt. % water: | 0.09 |
| Specific gravity @ 25° C. | 1.11 |

For spray foam processing, a Gusmer H-II machine and Model D spray gun were used.

In the following are described formulations and processing conditions in spray foam applications utilizing the novel polyols herein either as the main polyol or in combination with commercially used polyols. The following materials were used in the following examples:

FYROL PCF: a commercially available fire retardant, available from Stauffer Chemical, and being a mixture of

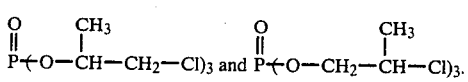

$P(-O-CH-CH_2-Cl)_3$ and $P(-O-CH_2-CH-Cl)_3$.

SURFACTANT DC-193: a hydroxyl group-containing silicone surfactant available from Dow Corning.
T-12: dibutyltin dilaurate
FREON: trichlorofluoromethane

EXAMPLE 1

| Resin Formulation | Weight Percent |
|---|---|
| Polyol I | 52.5 |
| Fyrol PCF | 12.0 |
| Ethylene glycol | 3.0 |
| Surfactant DC-193 | 1.5 |
| Catalyst T-12 | 0.6 |
| Freon | 30.4 |
| | 100.0 |

The resin viscosity was 300 cps at 25° C. The isocyanate and resin were processed at 1:1 volume ratio, at NCO/OH ratio of 1.4 using Mondur MR (a polymethylene polyphenyl isocyanate having an NCO content of 31.5%, an amine equivalent of 133, and a viscosity at 25° C. of 200 mPas). The processing temperature in both lines was 110° F.

The spray foam obtained exhibited good adhesion toward cardboard. It was fine-celled and had a good expansion. Its physical properties are given in Table 2.

EXAMPLE 2

| Resin Formulation | Weight Percent |
|---|---|
| Polyol II | 35.5 |
| Multranol 6501 | 17.0 |
| Fyrol PCF | 12.0 |
| Ethylene glycol | 4.0 |
| Surfactant DC-193 | 1.5 |
| Catalyst T-12 | 0.6 |
| Freon | 30.4 |

| Resin Formulation | Weight Percent |
|---|---|
| | 100.0 |

Multranol 6501 is a commercially available polyether polyol having an OH number of 375 and a viscosity of 950 mPas at 25° C. The resin formulated had a viscosity of 180 cps at 25° C. and a hydroxyl number (OH number) of 308 (calculated). It was sprayed with Mondur MR at an NCO/OH ratio of 1.45.

The spray foam obtained was fine-celled and had good expansion and good adhesion toward cardboard. Properties are listed in Table 2.

EXAMPLE 3

| Resin Formulation | Weight Percent |
|---|---|
| Polyol III | 51.5 |
| Fyrol PCF | 12.0 |
| Ethylene glycol | 4.0 |
| Surfactant DC-193 | 1.5 |
| Catalyst T-12 | 0.6 |
| Freon | 30.4 |
| | 100.0 |

The resin formulated had a viscosity of 580 cps at 25° C. and a hydroxyl number (OH#) of 317 (calculated). It was sprayed with Mondur MR at an NCO/OH ratio of 1.4. The temperature in Gusmer's lines for both liquids was kept at 130° F. during processing. Differences in the viscositites of the components A and B caused high operating pressures in the lines of the machine exceeding sometimes the allowed pressure limits.

The spray-foam obtained was fine-celled and had good expansion; however, we found that it contained irregularly distributed large voids and that its adherence toward cardboard was poor. The foam lifts had the tendency to separate easily. Properties are listed in Table 2.

EXAMPLE 4

| Resin Formulation | Weight Percent |
|---|---|
| Polyol V | 69.5 |
| Catalyst T-12 | 0.4 |
| Surfactant DC-193 | 0.6 |
| Freon | 29.5 |
| | 100.0 |

The resin formulated was processed with Mondur MR at an NCO/OH ratio of 1.2. The viscosities of components A and B were 200 and 480 cps at 25° C., respectively. The processing temperature of the liquids was 130° F.

The resin exhibited high reactivity and the obtained foam had a rough surface and uneven cells. Due to the small quantity of this polyol, a repeat of a spray foam trial with reduced amount of catalyst could not be realized. The determined properties of the spray foam are listed in Table 2.

EXAMPLE 5

| Resin Formulation | Weight Percent |
|---|---|
| Polyol VII | 69.4 |
| Catalyst T-12 | 0.5 |

-continued

| Resin Formulation | Weight Percent |
|---|---|
| Surfactant DC-193 | 0.6 |
| Freon | 29.5 |
| | 100.0 |

The viscosity of the resin formulated was found to be 420 cps at 25° C. It was processed with Mondur MR at an NCO/OH ratio of 1.1 at 130° F. to yield a fine-celled foam with good adhesion toward substrates. The resin exhibited high reactivity under these processing conditions. For this reason, the surface of the spray foam was, to some extent, rough. The determined properties of this foam are included in Table 2.

COMPARISON EXAMPLE

For comparison purposes, a resin blend based on a commercially available polyol of the type described in U.S. Pat. No. 3,297,597 was formulated in a nearly identical system to the systems based on the novel polyols herein and processed under as similar as possible conditions. The resulting data is summarized below:

| Resin Formulation | Weight Percent |
|---|---|
| Thanol 350-X | 69.5 |
| Catalyst T-12 | 0.4 |
| Surfactant DC-193 | 0.6 |
| Freon | 29.5 |
| | 100.0 |

The viscosity of the resin formulated was found to be 480 cps at 25° C. It was processed 130° F. with Mondur MR at an NCO/OH ratio of 1.2.

The fine-celled foam obtained exhibited good adhesion toward the substrate and a satisfactory expansion. Its properties are listed in Table 2.

weight aqueous solution of formaldehyde (152.18 mols) were added over a 1 hour period while keeping the temperature of the reaction mixture below 22° C. After the addition of the formaldehyde was completed, the contents of the reactor were heated to 35° C. and held at that temperature for 1 hour. The reactor was then heated to 85° C. and held at that temperature for one hour. The product was then vacuum distilled to yield Condensate IV containing 2.17% by weight water. A portion of Condensate IV was then adjusted to a 5.2% by weight water content (this portion is referred to as Condensate V).

To 8480 grams of Condensate V were added 11,521 grams of propylene oxide (198.36 mols) under agitation at about 105° C. and a pressure of about 29 psig for about 8 hours. The resultant polyol (Polyol XI) had a viscosity at 25° C. of 11,960 cps, a water content of 0.07 percent, an hydroxyl number of 497, and an acid number of 1.71.

To 8480 grams of Condensate IV were added 9217 grams of propylene oxide (158.7 mols) under agitation at 105° C. and a pressure of about 29 psig for about 8 hours. The resultant polyol (Polyol XII) had a viscosity at 25° C. of 31,200 cps, a water content of 0.06%, an hydroxyl number of 498 and no acid number.

To 8480 grams of Condensate IV were added 7,374 grams of propylene oxide (127 mols) followed by 1843 grams of ethylene oxide (41.85 mols) at 105° C. and a pressure of about 29 psig for about 8 hours. The resultant polyol (Polyol XIII) had a viscosity at 25° C. of 41,400 cps, a water content of 0.07%, an hydroxyl number of 503 and an acid number of 0.24.

Polyols XI, XII and XIII were then spray foam processed using a Gusmer H-II machine and Model D spray gun.

The following materials (not previously identified) were used in Examples 6 through 8:

POLYOL G-71-500: a commercially available polyol

TABLE 2

PHYSICAL PROPERTIES OF SPRAY FOAM SAMPLES DERIVED FROM VARIOUS POLYOLS

| Example No. | 1 | 2 | 3 | 4 | 5 | Comparison |
|---|---|---|---|---|---|---|
| Density, pcf | 2.1 | 2.1 | 2.1 | 2.1 | 1.86 | 2.1 |
| Cells % Open | 3.1 | 5.4 | 7.0 | 25.9 | 9.0 | 11.4 |
| % Closed | 94.1 | 91.2 | 89.3 | 70.9 | 88.5 | 85.9 |
| Compressive strength, | | | | | | |
| psi at 10% deflection | 18.5 | 29.3 | 28.0 | 32.5 | 29.5 | 33.0 |
| at yield | 15.3 | 27.5 | 24.3 | 31.3 | 28.8 | 33.3 |
| K-factor/thickness, inch | 0.163/ | 0.124/ | 0.145/ | 0.185/ | 0.116/ | 0.119/ |
| | 1.07 | 1.13 | 1.12 | 1.09 | 1.05 | 1.12 |
| Dimensional stability | | | | | | |
| 70° C./100% rel. Humidity (% ΔV) | | | | | | |
| at 1 week | +15.5 | +12.7 | +17.5 | +5.0 | +4.4 | +4.5 |
| at 4 weeks | +15.3 | +16.4 | +13.3 | +4.2 | +5.7 | +5.9 |
| 100° C./ambient rel. humidity (% ΔV) | | | | | | |
| at 1 week | +13.9 | +5.9 | +15.9 | +7.3 | +4.0 | +7.6 |
| at 4 weeks | +14.5 | +12.1 | +15.8 | +6.8 | +8.8 | +14.5 |
| −30° C./ambient rel. humidity (% ΔV) | | | | | | |
| at 1 week | +0.2 | +0.1 | −0.3 | +0.5 | 0.0 | −0.3 |
| at 4 weeks | +0.6 | −0.4 | −1.1 | +0.4 | −2.8 | −0.4 |

EXAMPLES 6 THROUGH 8

17.65 pounds of diethanolamine (76.15 mols), 31.58 pounds of phenol (152.2 mols) and 10.09 pounds of urea (76.2 mols) were charged to a reactor while cooling and agitating. There was a slight exotherm noted. The mixture was cooled to 18° C. and 27.23 pounds of a 37% by from OLIN CHEMICALS based on sucrose, mono-, di- and tri-ethanolamine, and having an OH number of 530.

TERATE 203: a commercially available mixture of aromatic polyester polyols derived from polycarbomethoxysubstituted diphenyl, polyphenyl and benzyl esters of the toluate family, and is available from Hercules, Inc.

PHT4-DIOL: a blend of low molecular weight, hydroxyl-terminated tetrabromophthalate polyester prepared by reacting tetrabromophthalic anhydride, diethylene glycol and propylene oxide. The product is commercially available from Velsicol Chemical Corporation and has an hydroxyl number of 215.

AMP-95: 2-amino-1-methyl-1-propanol, available from IMC Chemical Company.

UL-22: a commercially available organo tin carboxylate catalyst from Witco Chemical Co.

EXAMPLE 6

A resin formulation was made from the following:

| Ingredient | Parts by Weight |
| --- | --- |
| Polyol XI | 33.4 |
| POLYOL G-71-500 | 20.0 |
| TERATE 203 | 10.0 |
| PHT4-DIOL | 2.5 |
| FYROL PCF | 5.0 |
| AMP-95 | 5.0 |
| UL-22 | 0.15 |
| DC-193 | 0.70 |
| WATER | 0.25 |
| FREON | 22.0 |

The resultant resin mixture had a viscosity at 20° C. of 750 cps, a hydroxyl number of 381 and an acid number of 1.73.

The resin was processed at a 1:1 volume ratio and an NCO/OH ratio of 1.14 with Mondur MR. At the processing temperature of 120° F., the reactivity was found to be satisfactory. A light yellow-colored, nonsagging spray foam was obtained. The foam had even, fine cells with some pinholing and exhibited good adhesion towards the cardboard substrate. The physical properties were as set forth in Table 3.

EXAMPLE 7

A resin formulation was made from the identical materials and amounts of materials as set forth in Example 6, except that 33.4 parts by weight of Polyol XII were substituted for the 33.4 parts of Polyol XI. The homogeneous resin mixture had a viscosity at 20° C. of 960 cps, an hydroxyl number of 364 and an acid number of 1.56.

The resin was processed at a 1:1 volume ratio and an NCO/OH ratio of 1.19 with Mondur MR. At the processing temperature of 120° F., the reactivity was found to be satisfactory. A light yellow foam exhibiting good expansion and flow, fine, even cells (with some pinholing), and very good adhesion to the cardboard was obtained. The physical properties were as set forth in Table 3.

EXAMPLE 8

A resin formulation was made from the identical materials and amounts of materials as set forth in Example 6, except that 33.4 parts of Polyol XIII were substituted for the 33.4 parts of Polyol XI. The homogeneous resin mixture had a viscosity at 20° C. of 980 cps, an hydroxyl number of 361 and an acid number of 1.2.

The resin was processed at a 1:1 volume ratio and an NCO/OH ratio of 1.19 at 120° F. with Mondur MR. A light yellow foam having even, fine cells (with some pinholing) was obtained. Reactivity, expansion, flow and adhesion were very good. Physical properties were as shown in Table 3.

TABLE 3

| | Example 6 | Example 7 | Example 8 |
| --- | --- | --- | --- |
| Density, pcf | 2.16 | 2.21 | 2.22 |
| Cells % Open | 8.4 | 7.7 | 7.6 |
| % Closed | 88.8 | 89.5 | 89.5 |
| Compressive strength, psi | | | |
| @ 10% deflection | 37 | 38.5 | 39.8 |
| @ yield | 36 | 38.5 | 38.5 |
| K-factor/thickness (inch) | 0.127/ | 0.127/ | 0.126/ |
| | 1.16 | 1.12 | 1.09 |
| Dimensional stability | | | |
| 70° C./100% Rel. Hum. (% ΔV) | | | |
| at 1 day | +2.2 | +3.7 | +2.1 |
| at 2 weeks | +4.0 | +4.1 | +6.0 |
| at 4 weeks | +6.7 | +6.8 | +6.3 |
| 100° C./ambient rel. hum. (% ΔV) | | | |
| at 1 day | +0.2 | +0.8 | +0.7 |
| at 2 weeks | +4.6 | +4.1 | +4.1 |
| at 4 weeks | +4.0 | +5.4 | +6.3 |
| −30° C./ambient rel. hum. (% ΔV) | | | |
| at 1 day | −0.5 | −0.5 | −0.2 |
| at 2 weeks | −0.3 | +0.2 | +0.8 |
| at 4 weeks | −0.4 | −0.2 | −0.6 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyol comprising an alkoxylated modified resole, said modified resole being formed by the reaction of
   (i) a phenolic compound and/or mixtures of homologues thereof,
   (ii) urea and/or melamine,
   (iii) an organic primary and/or secondary amine group containing compound and
   (iv) an aldehyde wherein the molar ratio of the components (i), (ii), (iii) and (iv) in forming the modified resole, is 1:0.1–3.0:0.5–3:1–6.

2. The polyol of claim 1 wherein said organic primary and/or secondary amine group containing compound also contains one or more hydroxyl groups.

3. The polyol of claim 1 wherein said modified resole contains from about 0.01 to about 10 percent by weight of water.

4. The polyol of claim 3 wherein said modified resole contains from about 0.1 to about 6 percent by weight of water.

5. The polyol of claim 1 wherein said component i) is phenol.

6. The polyol of claim 1 having a hydroxyl number of from 400 to 700.

7. The polyol of claim 6 having a hydroxyl number of from 400 to 600.

8. A polyurethane and/or polyisocyanurate foam prepared by reacting an organic polyisocyanate with the polyol of claim 1 in the presence of a blowing agent.

* * * * *